UNITED STATES PATENT OFFICE.

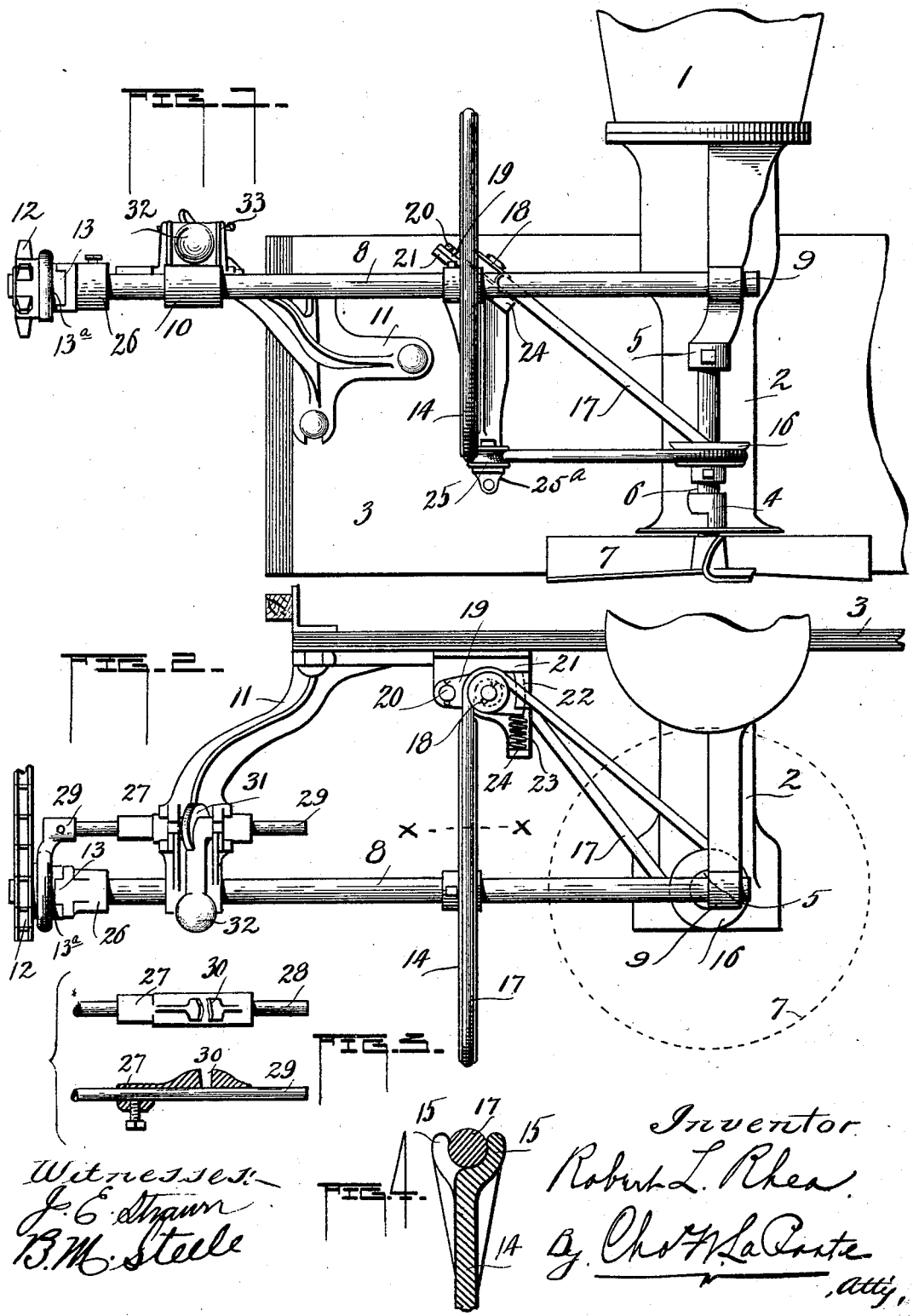

ROBERT L. RHEA, OF PEORIA, ILLINOIS.

SEEDING-MACHINE.

SPECIFICATION forming part of Letters Patent No. 710,119, dated September 30, 1902.

Application filed May 31, 1902. Serial No. 109,795. (No model.)

*To all whom it may concern:*

Be it known that I, ROBERT L. RHEA, a citizen of the United States, residing at Peoria, in the county of Peoria and State of Illinois, have invented certain new and useful Improvements in Seeding-Machines; and I do hereby declare that the following is a a full, clear, and exact description of the invention, which will enable others skilled in the art to which it appertains to make and use the same.

This invention has reference to improvements is seeding-machines, and the application herein is to an end-gate seeder, known as the "broadcast" variety.

The object which I have in view is to provide power transmission between the driving or power shaft and the fan-shaft of a seeder which comprises a cable or belt drive engaging devices of the driving and fan shafts.

The invention has for its further object a clutch mechanism whereby the sprocket-pinion of the power-shaft, which receives its power from a suitable source, may be intermittingly thrown into and out of gear with clutch parts fast to the driving-shaft and locked in such positions.

The invention comprises various details of construction and arrangement, as will be hereinafter more fully described in the specification, pointed out in the claims, and illustrated in the accompanying drawings, forming a part of this specification.

In the drawings, Figure 1 is a rear elevation of one form of machine to which my devices may be applied, parts thereof broken away. Fig. 2 is a plan of parts shown in Fig. 1. Fig. 3 refers to a plan and sectional elevation of certain clutch parts. Fig. 4 is a section on the line X X through the rim of the sheave-wheel on the driving-shaft.

As shown in the drawings, my devices are applied to an end-gate seeder; but it may be found desirable and practical to apply the same to various styles of seeding-machines. The seeder proper comprises a hopper 1, supported by a base of a spout or chute 2, which in turn is attached to an end gate or board 3. The base 2 is provided with bearings 4 and 5, in which is journaled a fan or distributer shaft 6, arranged vertically, and on the lower end of the fan-shaft is carried a fan 7, rotatably arranged beneath the chute or base 2 for distributing grain or seed fed thereto from the hopper 1.

8 indicates a driving-shaft having its inner end journaled in a bearing 9, forming a part of the base 2, and the outer end is journaled in a bearing 10 of a support or casting 11, which said casting is attached to the end gate 3 in the manner shown.

On the outer end of the driving-shaft 8 is arranged a sprocket-pinion 12, which may or may not be continuously driven from power devices, and the same is provided with a clutch-face 13 and with a groove $13^a$ in its body to receive certain shifting devices to be described, and the said sprocket is slidably arranged on the driving-shaft.

Referring to the driving and fan shafts, in this class of seeder means must be provided for driving the fan-shaft from the driving-shaft, and several forms of power-transmitters are provided, such as gearing, friction-gears, and equivalent means; but in this device I have provided for the transmission of power from the driving-shaft to the fan-shaft by means of sheave-wheels and a cable or belt traveling around said wheels. On the driving-shaft is provided the driving-sheave 14 having a peripheral edge, of alternately-arranged lips 15 extended from opposite sides in a manner to form a groove for the reception of a cable or belt.

16 refers to a sheave-wheel carried on the fan-shaft, as shown, having flanges of suitable contour to receive and guide a cable around the same, and 17 indicates a suitable cable traveling around the wheel 14 and the wheel 16 and engaging sheave-idlers 18 and 25 for guiding the cable from the wheel 14 to the wheel 16 and from the wheel 16 to the wheel 14.

18 is an idler around which the cable is directed as it leaves the upper part of the wheel 14, and the same is revoluble on a swinging plate 19, pivoted at 20 to a frame 21, supported from the end gate, and the plate 19 is held from upward movement by a lip 22 of the frame 21, which overlaps the free end of the plate 19. The idler 18 is arranged to swing for the purpose of taking up any slack in the cable, and the plate 19 is yieldingly held under pressure by means of a spring 23, bearing against the free end of the plate and an offset 24 of the frame 21.

25 is an idler similar to the idler 18 and is arranged to revolve on an extension 25$^a$ of the frame 21. The said idler is arranged to receive the cable from the sheave 16 on the fan-shaft and direct it to the driving-sheave 14 on the shaft 8. These idlers 18 and 25 may be transposed or other arrangement provided for guiding the cable that would perform the same function as the idlers.

Referring again to the sprocket 12 on the driving-shaft 8 and its clutch member, 26 is a clutch member fixed to the shaft 8, and 27 is a sliding member carried in a grooved opening in the frame 11. This member is adjustably carried on a rod 28, which is provided on its outer end with a sliding member 29, engaging the groove 13$^a$ in the body of the sprocket 12.

30 indicates a segmental worm formed on the member 27, and 31 is a segmental worm or cam wheel arranged on the end of a weighted lever 32, pivoted at 33 above the member 27 in such a manner as to cause an engagement of the segmental worm-wheel with the segmental worm. Thus it will be seen by throwing the lever in a direction opposite to the position it now occupies it will cause a shifting of the member 27 through the engagement of its cam with the segmental worm and release the clutch members and permit the sprocket-pinion 12 to rotate freely on the shaft, while the parts as they now appear will cause the shaft to rotate with the pinion.

It is obvious that various changes may be made in the application of my device and that details may be resorted to, and I do not wish to confine myself to the details of construction and arrangement herein.

Having thus fully described my invention, what I claim, and desire to secure by Letters Patent of the United States, is—

1. In a seeding-machine, and in combination substantially as described, a hopper and seeding devices supported on an end gate, a horizontally-arranged power-shaft having on one end a clutch part for throwing in and out power devices for actuating said shaft, a fan-shaft vertically arranged and a fan beneath the hopper, a sheave-wheel revoluble with the power-shaft and a sheave-wheel revoluble with the fan-shaft, a cable-drive traveling around the said wheels whereby the fan is rotated, and an idler journaled on a suitable support for guiding the cable from one wheel to the other and for taking up slack in the cable, for the purposes set forth.

2. In a seeding-machine, and in combination substantially as described, a hopper and seeding devices supported on an end gate, a distributing-shaft journaled on the seeder and a distributer mounted for rotation thereon and beneath the hopper, a driving-shaft suitably actuated, its outer end supported from the end gate and its inner end journaled in the seeder-frame, of a sheave-wheel on the driving-shaft and a sheave-pinion on the distributing-shaft, and a cable-drive connecting the sheave-wheels, for the purposes set forth.

3. In a seeding-machine, and in combination substantially as described, an end gate, a hopper and seeding devices supported thereby, a driving-shaft suitably actuated and a power-sheave revoluble therewith, a fan-shaft, and a fan mounted thereon and beneath the hopper, a sheave-wheel on the fan-shaft, a cable-drive connecting the drive and fan sheave wheels, and a device for taking up slack in the cable, for the purposes set forth.

4. The mechanism for actuating the fan-shaft and fan of an end-gate seeder, comprising a horizontal driving-shaft, and a vertically-arranged fan-shaft and fan rotatable therewith, sheave-wheels, one on the drive and one on the fan shaft, an endless cable connecting the wheels, two idlers disposed to the rear of said wheels and in front of the end gate, and arranged for directing the cable to and from the said wheels and one of said idlers arranged for taking up any slack in the cable, substantially as described.

5. In a seeding-machine, the combination with an end gate, of seeding devices supported thereby, a driving-shaft and a power-sheave revoluble therewith, a fan-shaft, and a fan mounted thereon, a sheave-wheel on the fan-shaft, a cable-drive connecting the drive and fan sheave wheels, and an adjustably-supported guiding device for the cable between the aforesaid sheave-wheels, for the purpose set forth.

6. In a seeding-machine, the combination with the seeding devices and end gate supporting the same, of the sheave-wheel 14, the shaft 8 supporting the same, the driven sheave 16 on the fan-shaft 6, the said shaft having on its lower end a seed-distributer, and an idler arranged for receiving the cable as it leaves the sheave 14 for guiding it to the fan-sheave and the same disposed between the end gate and the sheave 14, all substantially as and for the purposes set forth.

7. In combination with seeding devices and end gate supporting the same, a driving-shaft and a sheave-wheel 14 revoluble therewith, a fan-shaft and fan, and the sheave-wheel 16 mounted on said fan-shaft, a cable-drive engaging said wheels, an idler supported from the end gate journaled to swing on its support, around which the cable is directed as it leaves the sheave 14 and the same held under tension of a yielding device for taking up slack in the cable, substantially for the purposes set forth.

8. In combination with seeding devices, a fan-shaft, and a driving-shaft, means for actuating the driving-shaft, sheave-wheels, one on the fan-shaft and one on the driving-shaft, a cable for transmitting power from the driving-shaft to the fan-shaft, two idlers, one revoluble on a swinging frame, a spring for holding the frame for taking up slack in the cable, the other idler revoluble on a stationary frame for guiding the cable from the fan-sheave to the driving-sheave, substantially as described.

9. In combination with seeding devices, fan and driving shafts, clutch members of the driving-shaft, one loose and the other keyed to the shaft, clutch-shifting devices comprising a sliding member, a half-worm of said member and a swinging device carrying means engaging the said sliding device for controlling the movements of the clutch members, substantially as described.

10. In combination with seeding devices, fan and driving shafts, clutch members of the driving-shaft, one loose and the other keyed to the shaft, clutch-shifting devices comprising a swinging member, having a sectional worm-wheel, a sliding member having a clutch-shifting member and provided with means engaged by the sectional worm-wheel, arranged for controlling the movements of the clutch members, substantially as described.

11. In a seeding-machine, the combination of fan and driving shafts, a sprocket-pinion actuated by suitable driving device and slidably arranged on the driving-shaft, a clutch member forming a part of said sprocket, a clutch member fixed to the shaft, means for shifting the clutch part of the aforesaid sprocket, comprising a slidable rod provided with a partial worm, a weighted lever having a segmental worm-wheel engaging the worm of the rod, and driving connections between the fan and driving shafts, as and for the purpose described.

12. The combination with a seeding-machine, comprising a hopper, fan-shaft and fan, and a driving-shaft, a sprocket-pinion loosely carried on the driving-shaft arranged to be continuously driven and provided with a clutch member, a clutch member fast to the shaft, a sliding rod having connection with the member of the sprocket, a segmental worm forming part of said rod, and a lever having engagement with said worm for the purpose of controlling the movements of the clutch parts, substantially as described.

13. The mechanism for actuating the fan-shaft and fan of an end-gate seeder, comprising a horizontal driving-shaft, and a vertically-arranged fan-shaft and fan revoluble therewith, sheave-wheels, one on the drive-shaft and one on the fan-shaft, an endless cable connecting the wheels, two idlers arranged for directing the cable toward and from the aforesaid sheave-wheel, one mounted on a stationary support, and the other adjustable on its support, for the purpose described.

14. In combination with seeding devices and end gate supporting the same, a driving-shaft, a fan-shaft and fan, a sheave-wheel mounted on the driving-shaft having a peripheral edge, of alternately-extended lips forming an annular groove, a cable-drive engaging said wheels, and an idler supported from the end gate shiftable on its support around which the cable is directed, as and for the purposes set forth.

In testimony whereof I affix my signature in presence of two witnesses.

ROBERT L. RHEA.

Witnesses:
ROBERT N. MCCORMICK,
J. E. STRAWN.